A. G. HOLCOMBE.
Magneto Electric Machine.

No. 232,498. Patented Sept. 21, 1880.

2 Sheets—Sheet 1.

Witnesses.
William Shedlock.
H D Williams

Alfred G. Holcombe
Inventor
per Alfred Shedlock
atty.

A. G. HOLCOMBE.
Magneto Electric Machine.
No. 232,498. Patented Sept. 21, 1880.
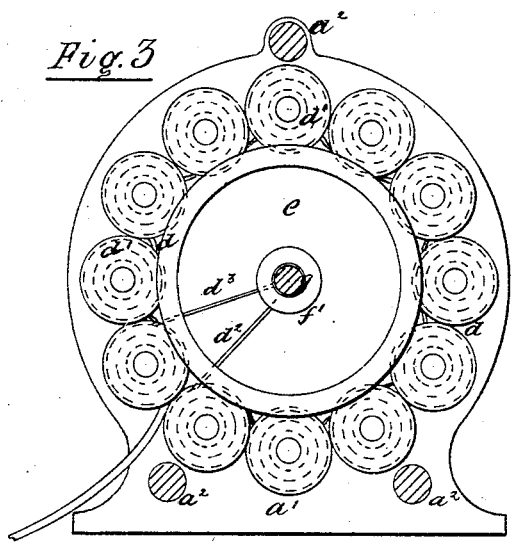
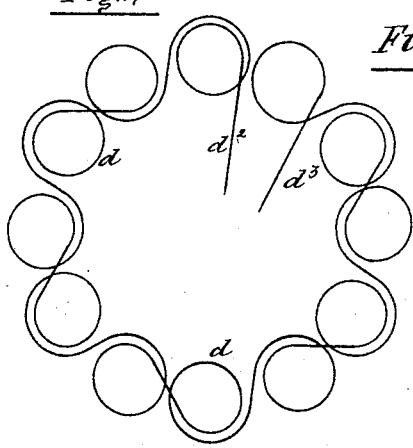
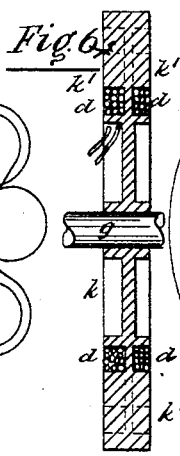
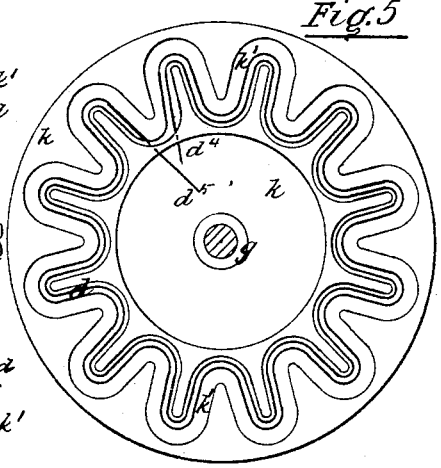
Witnesses.
William Shedlock.
H D Williams
Alfred G. Holcombe.
Inventor.
per
Alfred Shedlock.
Atty.

UNITED STATES PATENT OFFICE.

ALFRED G. HOLCOMBE, OF NEW YORK, N. Y., ASSIGNOR TO CHARLES A. SEELEY, OF SAME PLACE.

MAGNETO-ELECTRIC MACHINE.

SPECIFICATION forming part of Letters Patent No. 232,498, dated September 21, 1880.

Application filed February 7, 1879.

*To all whom it may concern:*

Be it known that I, ALFRED G. HOLCOMBE, of New York, county and State of New York, have invented certain new and useful Improvements in Magneto-Electric Machines, of which the following is a specification.

This invention relates to magneto-electric machines, or machines in which energy is converted into electricity by causing an electric conductor to move through or be acted upon by magnetic influence; and it consists in so arranging the conductor in which the electric current is induced and securing it on a diamagnetic frame or disk that the greater part of it is in radial position, or nearly so, to the direction of its motion, and in causing it to cut a powerful magnetic field maintained solely by magnets in which the magnetic force is kept constant, and in which field the lines of magnetic force are parallel to the axis of the conductor, so that the greater part of the conductor cuts the magnetic field in direction at right angles to the lines of force; but to describe my invention more particularly I will refer to the accompanying drawings, forming part of this specification, in which—

Figure 1:
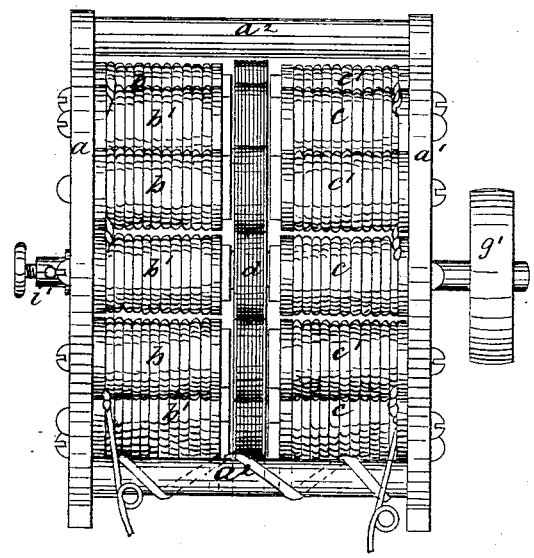
Figure 2:
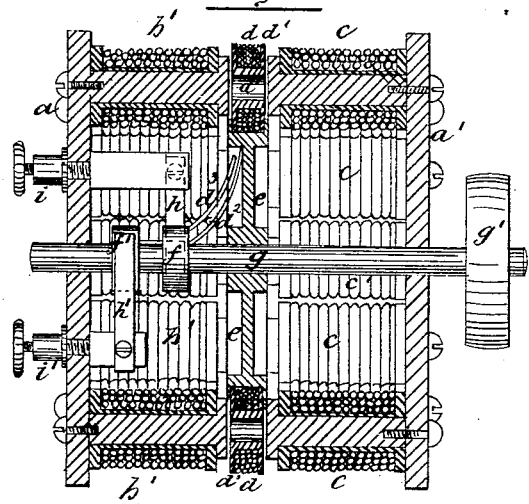

Figure 1, Sheet 1, is a side elevation of my improved machine for converting energy into electricity. Fig. 2, Sheet 1, is a central horizontal sectional view. Fig. 3, Sheet 2, is an end elevation with the end plate and one series of the fixed magnets removed. Fig. 4, Sheet 2, is a diagram illustrating the manner in which the moving conductor is arranged. Fig. 5, Sheet 2, is a view showing another method of arranging the moving conductor; and Fig. 6, Sheet 2, is a transverse section of Fig. 5.

The frame of the machine consists of two plates of iron, $a$ $a'$, fastened together by the rods $a^2$ $a^2$. Two series of electro-magnets, $b$ $b'$ and $c$ $c'$, are secured to the inside of the iron plates $a$ $a'$, and are so arranged as to leave an annular space between their poles. The wires of these magnets are connected together in one continuous circuit, and are so wound on the cores that when an electric current is passed through the circuit the adjacent poles in each series and the opposite poles of the two series are charged with magnetism of opposite polarity, which is maintained constant either by means of a voltaic battery, another magneto-electric machine, or by the electricity induced in the conductor moving in the annular space between the poles—that is, the sections marked $b$ $b$ in one series and those marked $c$ $c$ in the other series will have similar polarity, and the sections $b'$ $b'$ $c'$ $c'$ the opposite polarity.

The conductor $d$, in which the electric current is induced, is wound on flat bobbins $d'$ $d'$, made of a suitable diamagnetic material. These bobbins are secured in a groove formed in the periphery of the disk $e$, which is also made of a suitable diamagnetic material, and the wires in the bobbins $d'$ $d'$ are connected together in one continuous circuit in the manner represented in the diagram Fig. 4, Sheet 2, and the ends $d^2$ $d^3$ of the conductor $d$ are soldered to the collars $f$ and $f'$.

The shaft $g$, which has its bearings in the center of the end plates, $a$ $a'$, and to which motion is imparted by means of the pulley $g'$, has secured to it at its center the disk $e$, so that the conductor $d$, carried by the disk $e$, is caused to revolve in the annular space between the poles of the magnets $b$ $b'$ and $c$ $c'$. The collars $f$ and $f'$ are also secured to this shaft, but are electrically insulated therefrom. The springs or brushes $h$ $h'$ are fastened to the insulated connecting-posts $i$ $i'$ and bear on the collars $f$ and $f'$.

It will be observed that there are the same number of bobbins or sections in the conductor $d$ as there are magnets, and that each bobbin or section is approaching to or receding from the poles of each magnet at the same time, so that for every revolution of the shaft $g$ there is induced in the conductor $d$ and in an electric lamp or other circuit which may be connected to the posts $i$ $i'$ an alternating electric current of intensity equal to the combined action of all the magnets on the conductor, and of full pulsations equal to the number of magnets or sections in the conductor, which, in the machine shown in the accompanying drawings, would be twelve.

It is obvious that by means of a commutator or rheotome of ordinary construction the machine may be made to develop a continuous current.

It is also obvious that as many separate currents may be taken from the machine as there are sections in the conductor, or an equal divisor of them.

Fig. 5 shows another way of arranging the conductor $d$, which consists of a disk, K, provided with the continuous grooves K' K', one on each side of it, the principal lines of the grooves being radial. The conductor is placed in the groove by laying it all around against one side of it, and so following around the groove until the different layers completely fill it, as shown at Fig. 6, which is a transverse section of Fig. 5. The wires in the two grooves are then connected together, and the ends $d^4$ $d^5$ connected to the insulated collars. By this method of winding the conductor a greater part of it is caused to cut the lines of magnetic force at right angles. Consequently for a given useful effect less wire is required and the resistance to such extent reduced. The wire may be placed in grooves in sections, so that any desired number of separate currents may be had. A continuous current may also be obtained from a conductor arranged in this manner by using a commutator or rheotome.

It is obvious that the same result will attain if the magnets are caused to revolve and the electric conductor is held stationary.

I am aware that magneto-electric machines in which the electric current is set up in the conductor by causing it to cut the lines of force of a magnetic field maintained solely by primary stationary magnets have been heretofore made, as shown in the British Letters Patent to Charles W. Siemens, No. 2,006, and dated June 5, 1873, in which an electro or induced magnet is placed inside a revolving coil or coils, said coil or coils passing between the poles of the inside magnets and the poles of stationary outside magnets; so I wish it understood that I do not claim, broadly, a machine embodying this principle; but

What I claim, and desire to secure by Letters Patent, is—

In combination with two series of magnets, arranged substantially as shown, a conductor or conductors composed of a series of coils attached to a revolving diamagnetic disk in such a manner as to pass through at right angles the lines of force of the magnetic field, as hereinbefore set forth.

In witness whereof I have hereunto set my hand this 5th day of February, 1879.

ALFRED G. HOLCOMBE.

Witnesses:
ALFRED SHEDLOCK,
H. D. WILLIAMS.